Patented Aug. 14, 1934
1,969,963

UNITED STATES PATENT OFFICE 1,969,963

CHLOROPHENYLPHENOL AND METHOD OF MAKING SAME

Edgar C. Britton and Fred Bryner, Midland, Mich., assignors to The Dow Chemical Company, Midland, Mich., a corporation of Michigan No Drawing. Application December 1, 1930, Serial No. 499,312

10 Claims. (Cl. 260—154)

The present invention concerns new chlorophenols and soluble salts thereof, particularly monochloro-2-hydroxy-diphenyls and alkalimetal salts of the latter, as well as a method for the preparation thereof.

We have found that 2-hydroxy-diphenyl can be chlorinated to form substantially only the monochloro derivatives thereof, that the latter may then be separated into the individual isomeric components, and that such isomers can then be converted into well-defined crystallizable salts such as the alkali-metal salts thereof.

Our invention, then, consists of the method, steps and new products hereinafter fully described and particularly pointed out in the claims, the following description setting forth in detail several forms of product and modes of carrying out our invention, such disclosed forms and modes illustrating, however, but several of various ways in which the principle of our invention may be used.

In describing our invention, 2-hydroxy-diphenyl may be chlorinated in any of the ordinary ways, for instance with or without a catalyst, e. g. ferric chloride, by passing chlorine thereinto in or without the presence of a solvent such as benzene or carbon tetrachloride, and preferably with agitation of the liquid during the reaction. By passing chlorine into 2-hydroxy-diphenyl in amount less than that theoretically required to convert the latter completely into the monochloro compounds, we have obtained excellent yields of monochloro-2-hydroxy-diphenyls without the formation of substantial amounts of the di- and higher-chlorinated compounds. The reaction mixture may be fractionally distilled directly, or washed with water or an aqueous solution of an alkali such as sodium carbonate to remove acid previously to distillation, thereby separating the mixture into the isomeric monochloro compounds and recovering dichloro-2-hydroxy-diphenyl if formed. The distillation of these compounds is carried out preferably at pressures not over approximately 15 millimeters unless carried out in the presence of gaseous hydrogen chloride to repress the formation of the latter by splitting the same from the chloro-2-hydroxy-diphenyl being distilled.

The so obtained single monochloro compounds may, for instance, then separately be dissolved in aqueous or alcoholic sodium hydroxide of suitable concentration, and the thereby formed sodium salts of the monochloro-2-hydroxy-diphenyls be crystallized therefrom; or, if desired, distillation of the reaction product may be avoided by dissolving the latter in a solution of sodium hydroxide and separating the thereby formed sodium salts by fractional crystallization thereof.

The monochloro compounds formed as above have the following structural formulas,

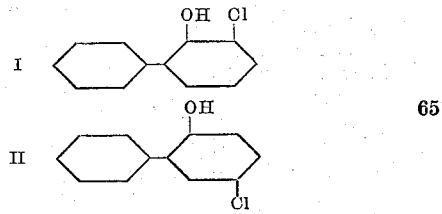

the Formulas I and II representing, respectively, 3-chloro-2-hydroxy-diphenyl and 5-chloro-orthophenylphenol, and have the physical characteristics as given in the following table,

| Cpd. with formula | Melting point | Boiling point | |
|---|---|---|---|
| | | 745 mm. | 15 mm. |
| I | 11° C. | 319° C. | 178° C. |
| II | 72° C. | 312° C. | 172° C. |

The said 3- and 5-chloro derivatives of 2-hydroxy-diphenyl are readily soluble in and crystallizable from the common organic solvents, e. g. chloroform, carbon tetrachloride, ether, alcohol, acetone, petroleum ether, and benzene. They combine directly with alkali-metals to form water-soluble salts and dissolve in aqueous solutions of sodium and potassium hydroxides, but are insoluble in water and aqueous ammonia.

The sodium salt of 3-chloro-2-hydroxy-diphenyl may be obtained from water in crystals containing 4 molecules of water of crystallization and melting at 84° to 85° C. Said sodium salt is readily soluble in water, acetone, methanol, ethanol, and diethyl ether, and is slightly soluble in benzene, chloroform, and carbon tetrachloride.

The sodium salt of 5-chloro-2-hydroxy-diphenyl crystallizes from water in crystals containing 3 molecules of water of crystallization, losing water by heating without melting, and having approximately the same solubilities as the above said salt of the corresponding 3-chloro derivative.

The above salts are white crystalline solids, which may be dehydrated under vacuum at a temperature above approximately 70° C. to form anhydrous salts having approximately the same solubilities as the hydrated salts. The anhydrous 3-chloro salt, dehydrated at room temperature over sulfuric acid and under a reduced pressure of 30 millimeters, melted at about 280° C. The anhydrous 5-chloro salt, dehydrated under a reduced pressure of 15 millimeters, first at 108° and then at about 130° C., decomposed at about 310° C., without melting.

The following examples represent ways of carrying out our invention:—

Example 1

5 moles of 2-hydroxy-diphenyl was chlorinated in a glass-lined reactor equipped with an iron agitator, at a temperature of 60°-80° C., by passing gaseous chlorine thereinto in the presence of approximately 1 per cent of ferric chloride catalyst for about 10 hours. Air was then passed through the reaction mixture to remove hydrochloric acid formed in the reaction. Sodium carbonate in amount equivalent to react with the ferric chloride catalyst and dissolved in a small amount of water, was added to the reaction mixture which was then thoroughly mixed, filtered by suction, and fractionally distilled at about 15 mm. pressure. The total yield of monochloro-2-hydroxy-diphenyls was approximately 80 per cent the 3-chloro and 5-chloro-2-hydroxy-diphenyls being present in about 80 per cent and 20 per cent of the total yield respectively.

Example 2

5 moles of 2-hydroxy-diphenyl was chlorinated similarly as in the above example, but in the absence of a catalyst, the combined monochloro compounds being obtained in about a 90 per cent yield, which comprised the 3-chloro and 5-chloro isomers in approximately the same proportion as given above.

Example 3

5-chloro-2-hydroxy-diphenyl was dissolved in 10 per cent aqueous sodium hydroxide, the latter being present in 5 per cent excess of that amount theoretically required to form the sodium salt. On cooling the so obtained solution to 0° C., the sodium salt of 5-chloro-2-hydroxy-diphenyl crystallized therefrom, the latter then being separated from the liquor and air dried.

Example 4

3-chloro-2-hydroxy-diphenyl was converted into the sodium salt thereof similarly as in Example 3.

Our invention accordingly consists of the monochloro-orthophenylphenols and the alkali-metal salts, as well as methods of preparing the same, such new compounds having the following general formula,

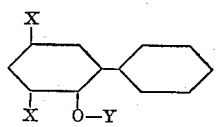

wherein one X represents chlorine, the other X represents hydrogen and Y represents a substituent selected from the group consisting of hydrogen and the alkali metals.

Our new compounds and their salts hereinbefore described are useful for disinfectants, fungicides, germicides, insecticides, preservatives, etc. Their relative effectiveness for these purposes is evidenced by their high phenol coefficients, e. g. 3-chloro-ortho-phenylphenol, 96.0; sodium 3-chloro-ortho-phenyl phenate, 103.0.

The toxicity of the chlorophenylphenols is also low, namely, about 0.3 as compared to phenol as 1. They may also be readily made up into solutions or in other forms, separately or in combinations with other materials, in condition suitable for dispensing.

Other modes of applying the principle of our invention may be employed instead of those explained, provided the details stated by any of the following claims or the equivalent thereof be employed.

We therefore particularly point out and distinctly claim as our invention:—

1. The method of making alkali-metal salts of 3-chloro-2-hydroxy-diphenyl and of 5-chloro-2-hydroxy-diphenyl, which comprises reacting 2-hydroxy-diphenyl with chlorine, at a temperature between about 0° and about 100° C., to form, simultaneously, 3-chloro-2-hydroxy-diphenyl and 5-chloro-2-hydroxy-diphenyl, separating said compounds from the reaction mixture so as to obtain each as the individual compound, dissolving each of said monochloro compounds, separately, in a solution consisting of an alkali-metal hydroxide and a solvent selected from the group consisting of water, alcohol, acetone, and mixtures thereof, and crystallizing the alkali-metal salts of 3-chloro-2-hydroxy-diphenyl and 5-chloro-2-hydroxy-diphenyl from the respective solutions of said compounds.

2. The method of making sodium salts of 3-chloro-2-hydroxy-diphenyl and of 5-chloro-2-hydroxy-diphenyl, which comprises reacting 2-hydroxy-diphenyl with approximately its molecular equivalent of chlorine, at a temperature between about 0° and about 100° C., to form, simultaneously, 3-chloro-2-hydroxy-diphenyl and 5-chloro-2-hydroxy-diphenyl, blowing the reaction mixture with air to remove hydrogen chloride therefrom, distilling said mixture under subatmospheric pressure to obtain 3-chloro-2-hydroxy-diphenyl and 5-chloro-2-hydroxy-diphenyl as the individual compounds, dissolving each of said monochloro compounds, separately, in aqueous sodium hydroxide, and crystallizing the sodium salts of 3-chloro-2-hydroxy-diphenyl and 5-chloro-2-hydroxy-diphenyl from the respective solutions of said compounds.

3. The method of simultaneously making 3-chloro-2-hydroxy-diphenyl and 5-chloro-2-hydroxy-diphenyl, which comprises reacting 2-hydroxy-diphenyl with approximately its molecular equivalent of chlorine, at a temperature between about 0° and about 100° C., blowing the reaction mixture with air to separate hydrogen chloride therefrom, and fractionally distilling said reaction mixture to obtain, separately, 3-chloro-2-hydroxy-diphenyl and 5-chloro-2-hydroxy-diphenyl.

4. As a compound, a monochloro-2-hydroxy-diphenyl compound having the general formula

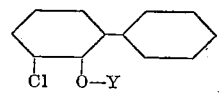

wherein Y represents a substituent selected from the group consisting of hydrogen and the alkali-metals.

5. As a compound, 3-chloro-2-hydroxy-diphenyl, melting at about 11° C., and boiling at about 319° C., under atmospheric pressure.

6. As a compound, the sodium salt of 3-chloro-2-hydroxy-diphenyl, said salt melting at about 280° C.

7. As a compound, a hydrate of the sodium salt of 3-chloro-2-hydroxy-diphenyl, one molecule of said hydrate containing 4 molecules of water of crystallization and melting at about 84–85° C.

8. The method of making 3-chloro-2-hydroxy-diphenyl which comprises chlorinating 2-hydroxy-diphenyl to form monochloro-derivatives thereof, and separating 3-chloro-2-hydroxy-diphenyl from the chlorinated mixture.

9. The method of making 3-chloro-2-hydroxy-diphenyl and 5-chloro-2-hydroxy-diphenyl simultaneously which comprises chlorinating 2-hydroxy-diphenyl to form monochloro-derivatives thereof, and fractionally distilling the chlorinated mixture to obtain, separately, 3-chloro-2-hydroxy-diphenyl and 5-chloro-2-hydroxy-diphenyl.

10. The method of making an alkali metal salt of 3-chloro-2-hydroxy-diphenyl which comprises dissolving 3-chloro-2-hydroxy-diphenyl in a solution of an alkali metal hydroxide and a solvent selected from the class consisting of water, alcohol, acetone, and mixtures thereof, and crystallizing the alkali metal salt of 3-chloro-2-hydroxy-diphenyl from the resulting solution.

EDGAR C. BRITTON.
FRED BRYNER.

CERTIFICATE OF CORRECTION.

Patent No. 1,969,963.                                                            August 14, 1934.

EDGAR C. BRITTON, ET AL.

It is hereby certified that error appears in the printed specification of the above numbered patent requiring correction as follows: Page 1, line 71-72, for "5-chloro-orthophenylphenol" read 5-chloro-2-hydroxy-diphenyl; and that the said Letters Patent should be read with this correction therein that the same may conform to the record of the case in the Patent Office.

Signed and sealed this 2nd day of October, A. D. 1934.

Leslie Frazer (Seal)                                         Acting Commissioner of Patents.